United States Patent [19]

Swenson et al.

[11] 4,165,901
[45] Aug. 28, 1979

[54] VEHICLE SEAT HAVING ARM REST ADJUSTMENT MEANS

[75] Inventors: Richard F. Swenson, Milwaukee; Shawn H. Eimen, Menomonee Falls; John J. Gryga, Jr., Milwaukee, all of Wis.

[73] Assignee: Milsco Manufacturing Company, Brown Deer, Wis.

[21] Appl. No.: 888,551

[22] Filed: Mar. 20, 1978

[51] Int. Cl.² .............................................. A47C 7/54
[52] U.S. Cl. ................................................. 297/417
[58] Field of Search ................ 297/113, 115, 408, 417

[56] References Cited

U.S. PATENT DOCUMENTS

| 2,043,626 | 6/1936 | Morrison | 297/417 X |
| 3,537,749 | 11/1970 | Pustch et al. | 297/408 |

Primary Examiner—James C. Mitchell
Attorney, Agent, or Firm—James E. Nilles

[57] ABSTRACT

A vehicle seat comprises a pair of laterally spaced apart support plates, a pair of laterally spaced apart arm rests, and independently adjustable arm rest support assemblies for adjustably supporting each arm rest on an associated support plate so that each arm rest can be shifted and also pivoted to different positions in a vertical plane. Each arm rest assembly comprises a pair of elongated support links; a link plate; and pivot means for pivotably connecting the link plate and one end of one elongated support link to the arm rest whereby the arm rest can be pivoted to different positions thereabout. The other elongated support link has one end pivotally connected to the link plate and its other end pivotally connected to the support plate. Adjustable connector means are provided for connecting the other end of the said one support link to the support plate and comprise: a ring gear connected to the other end of the said one support link; a spur gear engaged with the ring gear; an eccentric pin connected to the spur gear; means for rotatably connecting the eccentric pin to the support plate; and a control knob connected to the eccentric pin and adjustably rotatable to effect rotation of the eccentric pin and spur gear and planocentric rotation of the ring gear, whereby the said one support link and the arm rest attached thereto are shiftably movable to desired locked positions relative to the support plate.

5 Claims, 17 Drawing Figures

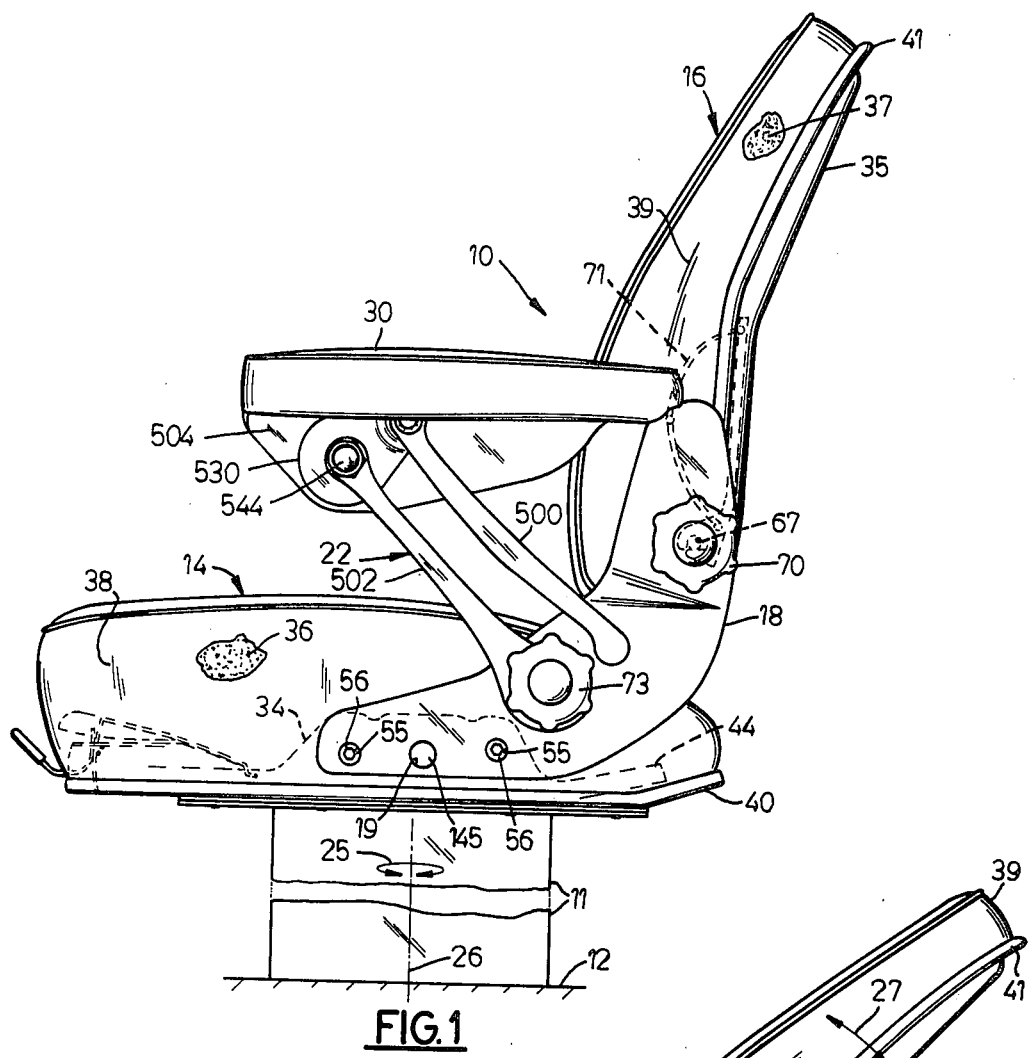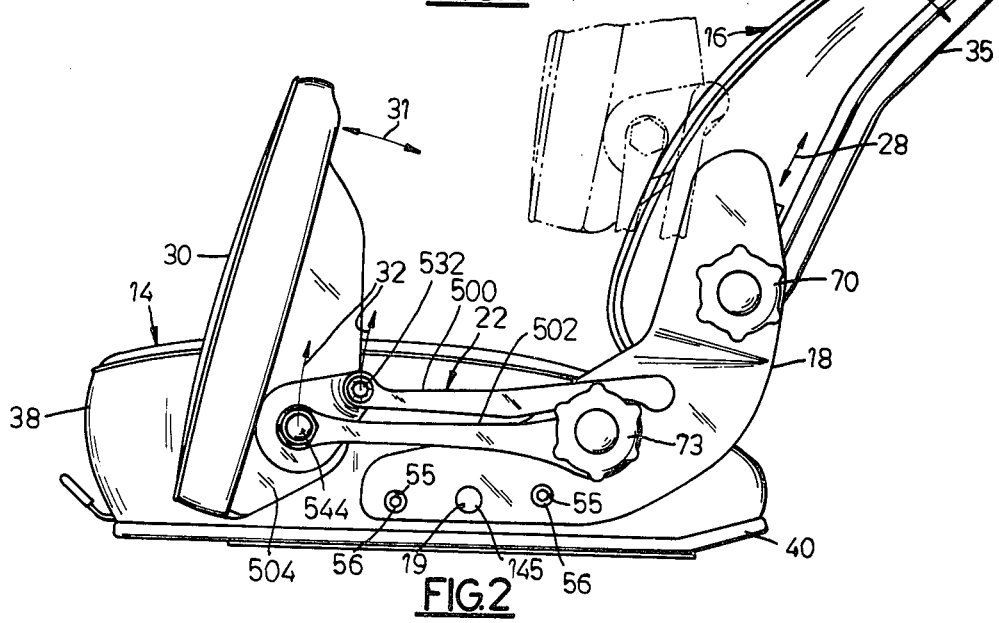

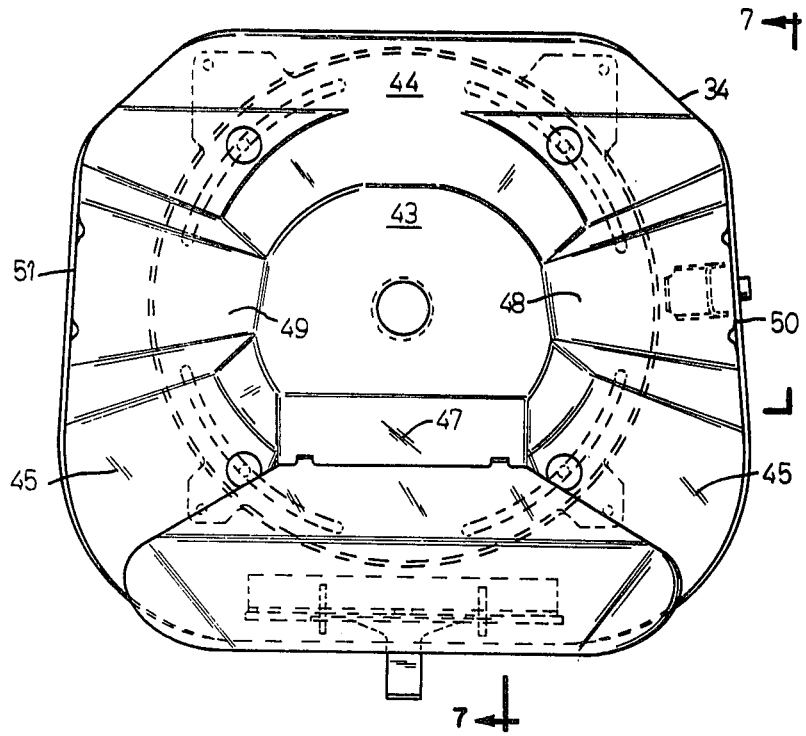
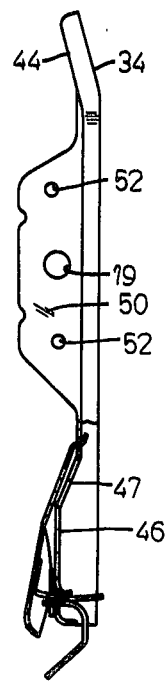
FIG. 6 FIG. 7
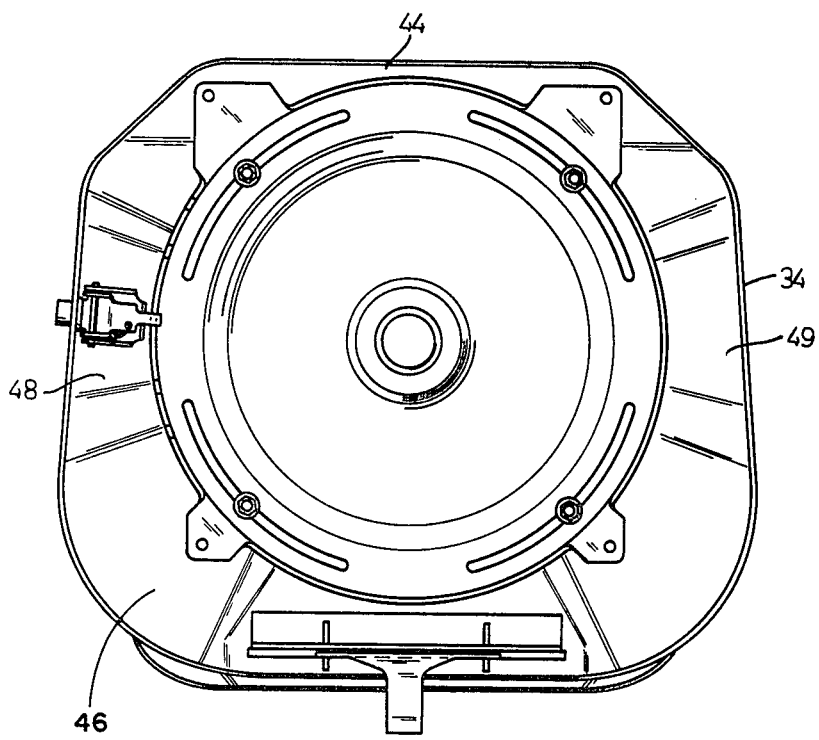
FIG. 5

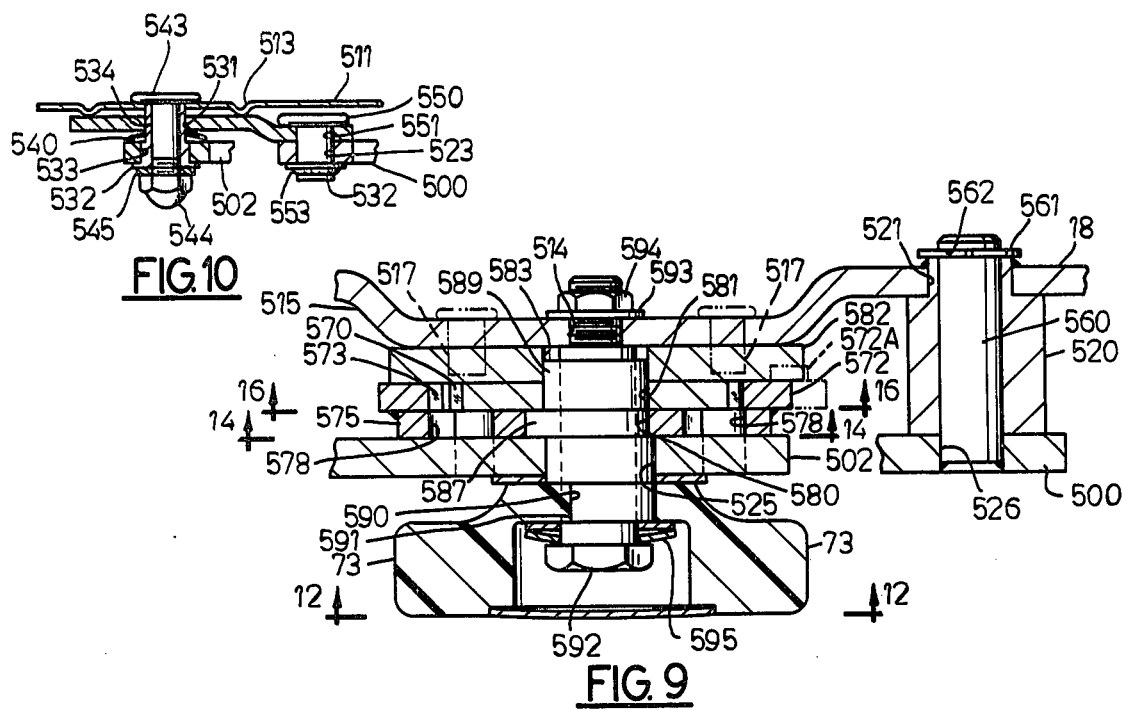
FIG. 10
FIG. 9
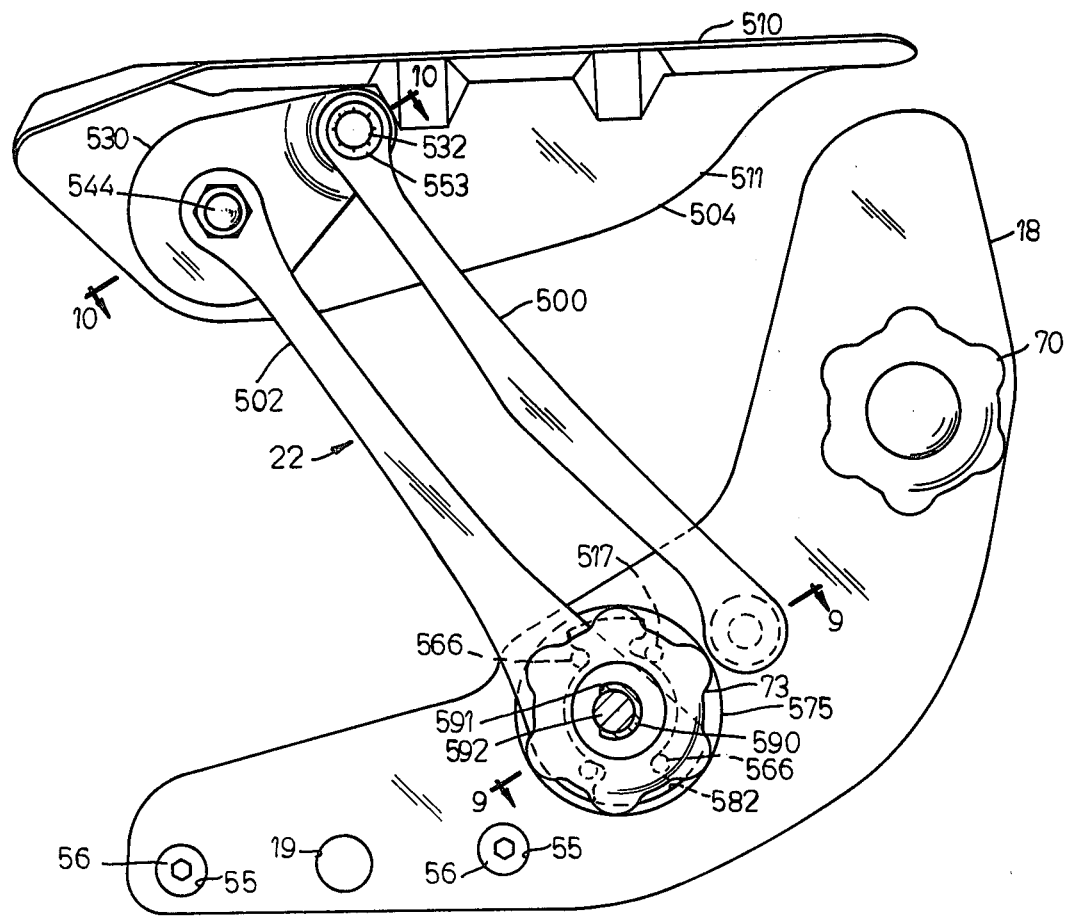
FIG. 8

4,165,901

VEHICLE SEAT HAVING ARM REST ADJUSTMENT MEANS

BACKGROUND OF THE INVENTION

1. Field of Use

This invention relates generally to vehicle seats such as are used as driver's or operator's seats on vehicles such as tractors, construction machines, or the like. In particular, it relates to vehicle seats having arm rest adjustment means.

2. Description of the Prior Art

Some vehicle seats comprise a seat assembly and an attached backrest assembly and are constructed so as to be mountable either on the floor or on a floor-mounted pedestal in the driver's compartment or station on the vehicle. Some such vehicle seats include arm rests located on opposite sides of the seat assembly and connected either thereto, or to the backrest, or to the vehicle floor. In many cases, the armrests are stationarily mounted, although some are adjustable.

SUMMARY OF THE INVENTION

In accordance with the present invention, there is provided a vehicle seat which comprises a seat assembly having a seat pan, a backrest assembly, and a pair of connector plates connected to opposite lateral sides of the seat pan for supporting the backrest assembly, and for supporting a pair of independently adjustable arm rest assemblies. Each arm rest assembly comprises an arm rest and upper and lower elongated parallel support links, each support link having a circular mounting hole near each end thereof. A link plate is pivotally connected by pivot pins to the forward ends of both support links, and one of these pivot pins also secures the lower support link and link plate to the arm rest whereby the arm rest is pivotal thereabout. A lower pivot pin pivotally connects the rear end of the upper support link to the connector plate on the seat pan. Planetary gears are provided, including a spur gear fixed to an eccentric pin and a ring gear having internal teeth engaged with the spur gear. The ring gear is secured to a ring gear support plate which is loosely but nonrotatably secured to the rear end of the lower support link. The eccentric pin is rotatable by an arm adjustment knob located outside the connector plate and has eccentric cylindrical portions. The circular mounting hole in the lower end of the lower support link is misaligned with a circular hole in the ring gear support plate, but is aligned with a circular hole in the connector plate on the seat pan. Each circular hole is engaged with a different portion of the eccentric pin whereby knob rotation causes slight harmonic travel (oscillation) and rotation of the ring gear and corresponding pivotal movement of the upper support link thereby swinging the arm rest in a vertical plane. Stop pins on the connector plate are engageable with a stop plate welded to the spur gear to limit arm rest travel.

The arm rest assemblies in accordance with the invention are independently adjustable with respect to each other and with respect to the backrest assembly and are adaptable for use with various types of vehicle seats.

The arm rest in each arm rest assembly can be fully raised and lowered or set to any position therebetween and is automatically locked in its various positions. Furthermore, the arm rest can be rotated relative to the elongated support links thereby enabling it to be swung upwardly to the rear into a fully stored position or can be swung forward out of the operator's way when the elongated support links are fully depressed.

Other objects and advantages of the invention will hereinafter appear.

BRIEF DESCRIPTION OF THE DRAWINGS

FIG. 1 is a side elevational view of a vehicle seat in accordance with the invention showing the backrest in upright position and the arm rests in upright position;

FIG. 2 is a view similar to FIG. 1 but showing the backrest tilted rearwardly and the arm rest positioned forwardly and rotated forwardly;

FIG. 5 is a bottom plan view of the vehicle seat shown in FIGS. 1–4;

FIG. 6 is a top plan view of the seat pan shown in FIG. 5;

FIG. 7 is a side elevational view partly in cross section taken on line 7—7 of FIG. 6;

FIG. 8 is an enlarged view with certain elements removed of the arm rest assembly shown in FIG. 1;

FIG. 9 is an enlarged cross-sectional view taken on line 9—9 of FIG. 8;

FIG. 10 is an enlarged cross-sectional view taken on line 10—10 of FIG. 8;

DESCRIPTION OF A PREFERRED EMBODIMENT

General Arrangement

Figure 3:
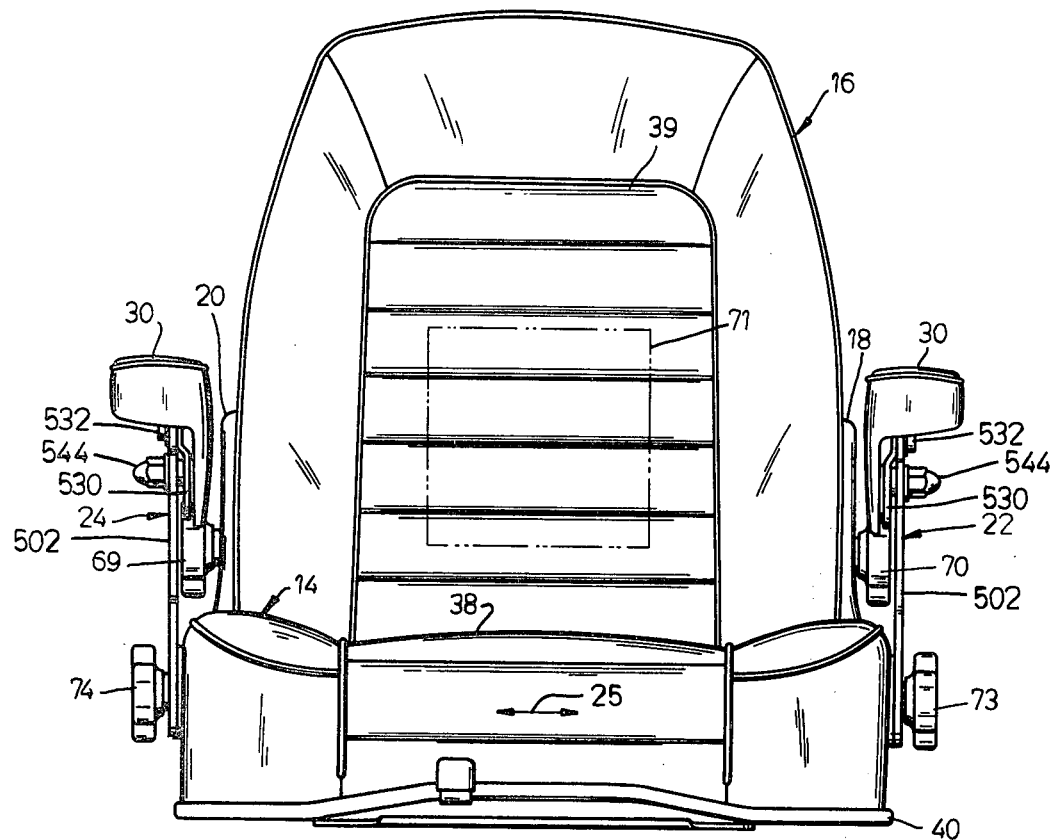
FIG. 3 is a front elevational view of the vehicle seat shown in FIG. 1.

FIGS. 1, 2, 3, and 4 show a vehicle seat 10 in accordance with the invention mounted on a pedestal 11 (FIG. 1) which, in turn, is mounted on the floor 12 of a vehicle such as a tractor, construction machine, or the like. In the following description, the terms "left" and "right" refer to the left and right sides of the vehicle seat relative to the occupant of the seat, unless otherwise noted, and regardless of orientation of a component in a particular drawing figure.

Seat 10 comprises a seat assembly 14, a backrest assembly 16 connected to the seat assembly by a pair of stamped sheet metal L-shaped connector plates 18 (left) and 20 (right), and a pair of independently operable arm rest assemblies 22 (left) and 24 (right) connected to the connector plates 18 and 20, respectively.

Seat 10 can swivel 30° right or left for a total of 60° in the direction of the arrow 25 (FIG. 1) about a vertical axis 26 with respect to pedestal 11. Backrest assembly 16 can be tilted forward or rearward to a limited degree (about 28° total travel from the vertical in one direction)

in the direction of the arrow 27 (FIG. 2) and can also be raised or lowered in the direction of the arrow 28 (FIG. 2) with respect to seat assembly 14. The arm rest 30 of each arm rest assembly 22, 24 is rotatable in a vertical plane in the direction of arrow 31 (FIG. 2) and is also shiftable upwardly and downwardly in the vertical plane in the direction of the arrows 32 (FIG. 2), as comparison of FIGS. 1 and 2 shows.

As FIGS. 1–7 show, seat assembly 14 and backrest assembly 16 generally comprise rigid stamped sheet metal frames or pans 34 and 35, respectively, shaped or contoured layers or blocks 36 and 37, respectively, of resilient compressible material, such as foam or sponge rubber or the like, for disposition on the respective pans, flexible exterior upholstery covers 38 and 39, respectively, of vinyl or the like overlying and adhering to the blocks 36 and 37, respectively, and metal edging or finishing strips 40 and 41, respectively.

As FIGS. 5 and 6 best show, seat pan 34, which is generally rectangular around its periphery, comprises a downwardly concave circular central portion 43, a flat upwardly sloped rear portion 44, flat forward portions 45, a flat raised forward portion 46 having a downwardly sloped adjacent portion 47, and upwardly sloped side portions, left and right side portions 48 and 49, respectively, which terminate in integrally formed downwardly depending left and right side plates 50 and 51, respectively. Each side plate 50 and 51 is provided with a pair of spaced apart mounting holes 52.

As FIGS. 1, 2, 3, and 4 show, each connector plate 18 and 20 comprises a pair of spaced apart mounting holes 55 in its lower leg for accommodating mounting bolts 56 which extend therethrough and through the threaded mounting holes 52 in the seat pan side plates 50 and 51 to rigidly secure the connector plates 18 and 20 to the seat pan 34.

Figure 4:
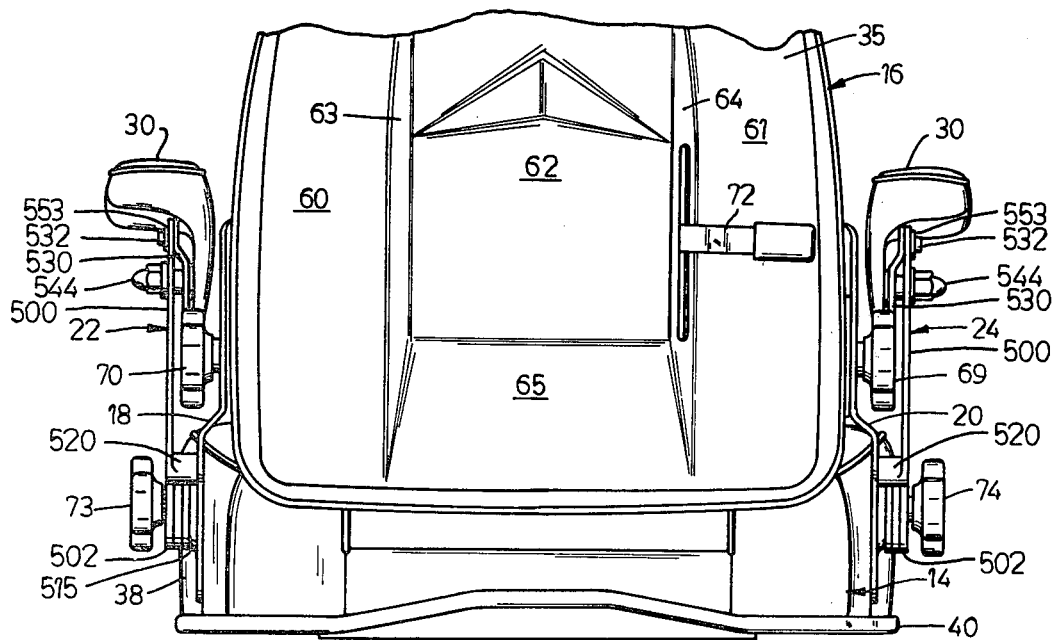
FIG. 4 is a rear elevational view of the vehicle seat shown in FIG. 1.

As FIG. 4 shows, backrest pan 35, which is generally rectangular around its periphery, comprises spaced apart slightly rearwardly curved left and right side portions 60 and 61, respectively, and a rearwardly concave rectangular central portion 62 which is bounded on its left and right edges by rearwardly sloped side portions 63 and 64, respectively, and a rearwardly sloped bottom portion 65.

The connector plates 18 and 20 have holes such as 67 near the upper ends thereof for control components associated with the backrest tilt adjustment means and the backrest vertical (height) adjustment means, respectively. Means are provided to connect and support the backrest assembly 16 to the connector plates 18 and 20 of the seat assembly 14 and also to enable the backrest assembly to be raised and lowered vertically to various positions and to be tilted forwardly and rearwardly to various positions relative to the seat assembly. Such means include a height adjustment knob 69 and a tilt adjustment knob 70. Means, including a control lever 72, are also provided in the backrest assembly 16 to horizontally adjust lumbar support 71 embodied therein. The backrest tilt adjustment means, the backrest vertical adjustment means, and the lumbar support adjustment means employ or embody various common elements or components. Means, including arm rest adjustment knobs 73 and 74, are provided in the arm rest assemblies 22 and 24, respectively.

Arm Rest Adjustment Means

As hereinbefore explained and as FIGS. 8, 9, 10, and 11 show, vehicle seat 10 comprises seat assembly 14 having seat pan 34, backrest assembly 16, and the pair of connector plates 18 and 20 connected to opposite lateral sides of the seat pan for supporting the backrest assembly, and for supporting the pair of independently adjustable arm rest assemblies 22 and 24, respectively.

The left and right arm rest assemblies 22 and 24, respectively, which are independently controlled from the left and right sides of the vehicle seat 10 by the knobs 73 and 74, respectively, comprise the following components. However, since both assemblies 22 and 24 are identical but mirror images of each other, only the left arm rest assembly 22 is hereinafter described in detail. Thus, arm rest assembly 22 generally comprises an arm rest 30 and a pair of elongated generally parallel arm support links, including a forward (or lower) support link 502 and a rear (or upper) support link 500, connected between the arm rest 30 and the left connector plate 18 of vehicle seat 10. Arm rest 30 comprises a rigid arm frame plate 504, formed by stamping from sheet metal, a shaped or contoured layer or block 505 of resilient compressible material, such as foam or sponge rubber or the like, for disposition on the frame 504, and a flexible exterior cover 506 overlying and adhering to the layer 505. Arm frame plate 504, which is of L-shaped cross section, has a generally flat upper portion 510 and a generally flat vertically depending portion 511 which is provided with a mounting hole 512 and an integrally formed outwardly extending annular boss 513 therearound which serves as a spacer.

Left connector plate 18 comprises an outwardly extending generally circular boss 515 having the mounting hole 514 therethrough and a pair of spaced apart outwardly projecting rigid pins 517 which are secured as by welding in holes 518 in connector plate 18. Left connector plate 18 also is provided a hollow cylindrical bushing 520 which is rigidly secured as by welding in a hole 521 in connector plate 18.

Figure 11:
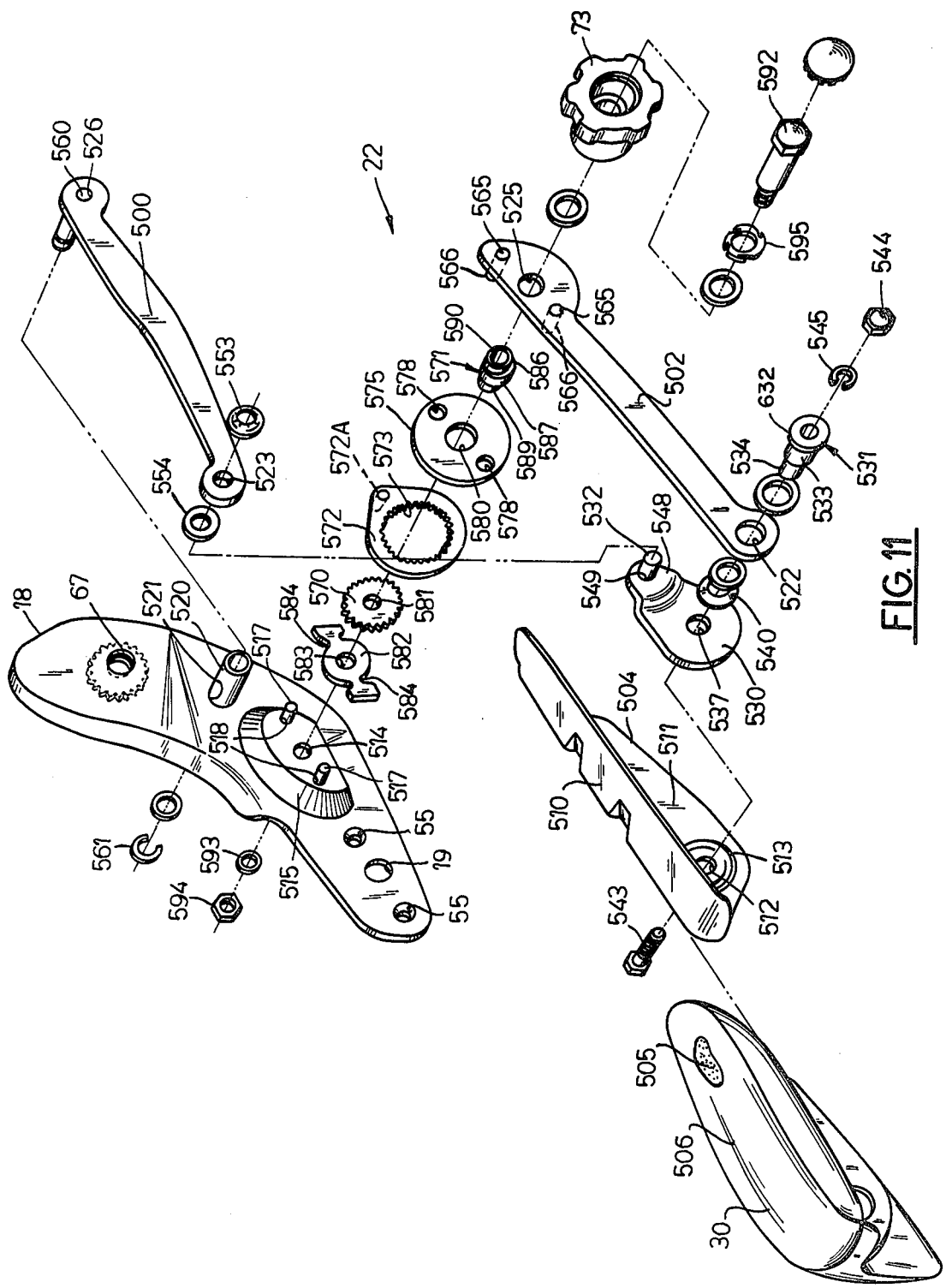
FIG. 11 is an exploded view of the arm rest assembly shown in FIGS. 1–10.
Figure 16:
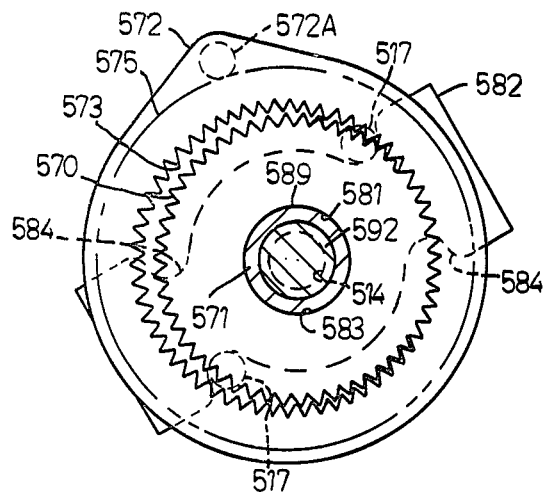
FIG. 16 is a cross-sectional view taken on line 16—16 of FIG. 9.
Figure 17:
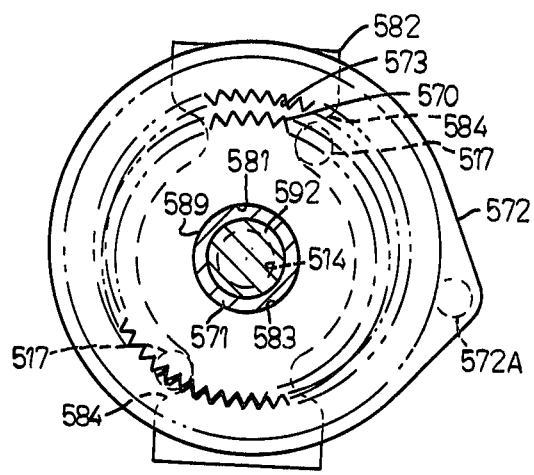
FIG. 17 is a view similar to FIG. 16 but showing certain components removed to another position.
Figure 14:
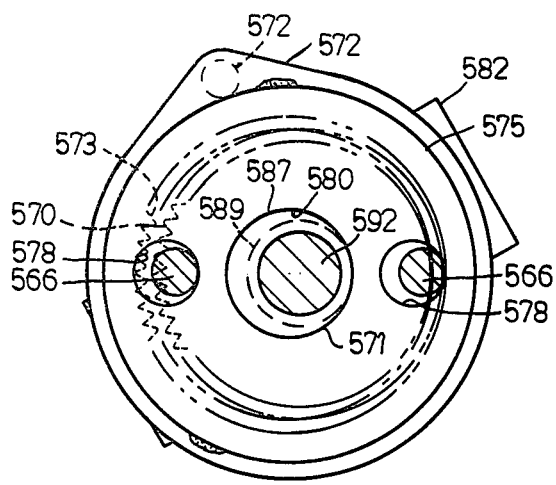
FIG. 14 is a cross-sectional view taken on line 14—14 of FIG. 9.
Figure 15:
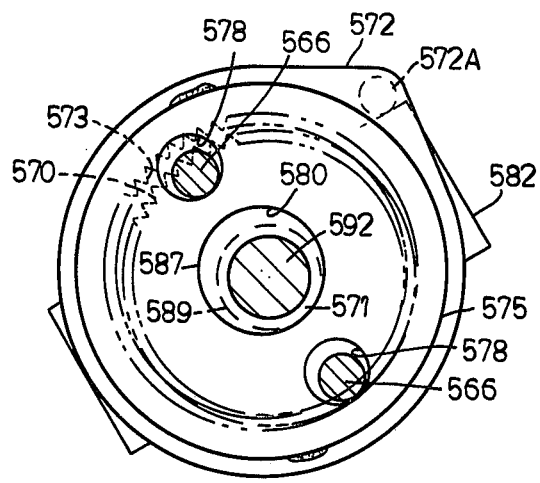
FIG. 15 is a view similar to FIG. 14 but showing certain components removed to another position.
Figure 12:
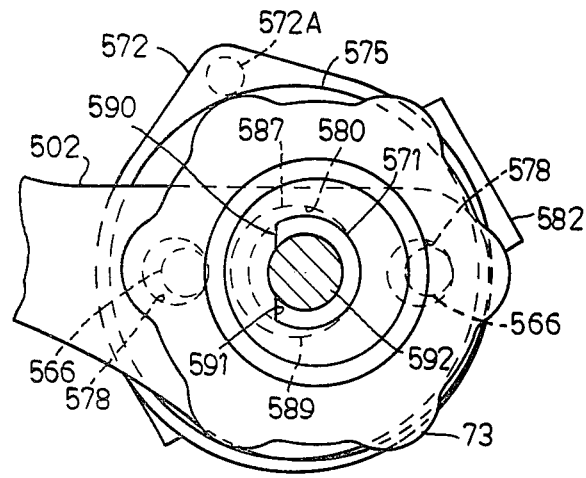
FIG. 12 is a cross-sectional view taken on line 12—12 of FIG. 9.
Figure 13:
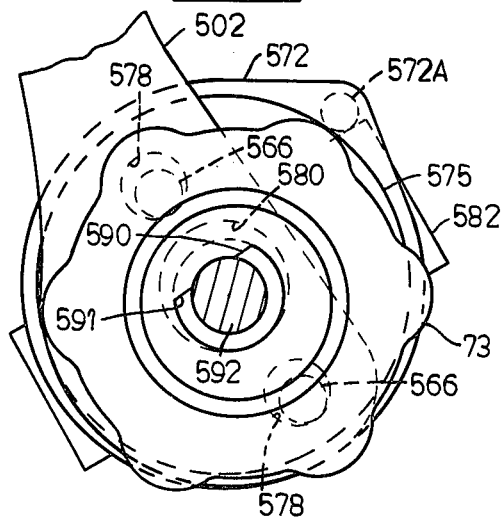
FIG. 13 is a view similar to FIG. 12 but showing certain components removed to another position.

Forward and rear arm support links 502 and 500, respectively, which take the form of elongated flat steel members, have circular mounting holes 522 and 523, respectively, near their upper or forward ends. The support links 502 and 500 also have circular mounting holes 525 and 526, respectively, near their lower or rear ends. A link plate 530 is pivotally connected by pivot pins 531 and 532 to the forward ends of both support links 502 and 500, and the pivot pin 531 also secures the lower support link 502 and link plate 530 to the arm rest plate 504 whereby the arm rest 30 is pivotal thereabout. More specifically, as FIGS. 10 and 11 show, pivot pin 531 takes the form of a hollow cylindrical mounting pin or bushing which comprises a relatively wide flange or head 632 at its outer end, an intermediate portion 533 of reduced diameter adjacent the flange and an inner end portion 534 of smaller diameter than the intermediate portion 533. Inner end portion 534 extends into mounting hole 512 in arm frame plate 504 and through a circular mounting hole 537 in link plate 530. Intermediate portion 533 of bushing 531 extends into circular mounting hole 522 in forward arm support link 502 and the flange 532 bears against the outside of link 502. A concave spring steel belleville washer 540 is located on inner end portion 534 of bushing 531 between link plate 530 and forward arm support link 502. An attachment bolt 543 extends through hollow bushing 531, with its head bearing against arm frame plate 504 and its associated nut 544 bears against a lock washer 545 which, in turn, bears against flange 532 of bushing 531. Thus, forward arm support link 502 and arm frame plate 504 are pivotally movable relative to each other and link plate 530 is relatively pivotable to both.

Link plate 530 has an outwardly offset rearwardly extending flange 548 in which a circular mounting hole 549 is provided. Pivot pin 532, having a flat head 550, extends through a mounting hole 549 in the link plate flange 548 and through the mounting hole 523 at the upper or forward end of rear arm support link 500 and is retained therein by a spring steel press-on washer 553. A washer 554 is provided on pin 532. Thus, rear arm support link 500 and link plate 530 are pivotally movable relative to each other. As FIG. 9 shows, a lower pivot pin 560 extends through circular mounting hole 526 at the rear end of rear arm support link 500 and through the hollow bushing 520 on the left connector plate 18 on seat pan 34 to pivotally connect support link 500 thereto. Pin 560 is secured in place by a split-ring or washer 561 disposed in a circumferential groove 562 on the pin.

Planocentric gears are provided, including a spur gear 570 fixed to an eccentric pin 571 and a ring gear 572 having internal teeth 573 engaged with the spur gear. The ring gear 572 is secured as by welding to the inner side of a ring gear support plate 575 which is loosely but non-rotatably secured to the rear end of the lower support link 502 by the pins 566.

The lower or rear end of forward arm support link 502 has a pair of spaced apart holes 565 on opposite sides of mounting hole 525 in which inwardly projecting pins 566 are rigidly secured as by welding. The pins 566 loosely engage a pair of spaced apart pin-receiving holes 578 of larger diameter which are provided in ring gear support plate 575, which also has a relatively large centrally located circular hole 580. Spur gear 570 has a central circular opening 581 and is welded to a spur gear stop plate 582. Spur gear stop plate 582 has a central circular opening 583 and is provided on its periphery with four stop notches 584 which cooperatively engage with the stop pins 517 on connector plate 18 to limit rotation of spur gear 570 in either direction relative to the connector plate.

As FIGS. 9 and 11 best show, hollow eccentric pin 571, which is rotatable by knob 73, is provided which has an outer cylindrical portion 586 which extends into mounting hole 525 in forward arm support link 502. Eccentric pin 571 also comprises an intermediate cylindrical portion 587 which is axially offset from outer pin portion 586 and which extends into circular hole 580 in ring gear mounting plate 575. Eccentric pin 571 further comprises an inner cylindrical portion 589 which is on the same axis as outer cylindrical pin portion 586 but of smaller diameter. Portion 589 extends into the openings 581 and 583 in the spur gear 570 and spur gear stop plate 582, respectively. Eccentric pin 571 has a non-circular end portion 590 adjacent the outer cylindrical portion 586 which engages a correspondingly shaped hole 591 in arm rest adjustment knob 73. The knob 73 is secured to the eccentric pin 571 and the latter is secured to the left connector plate 18 against axial displacement by a bolt 592 having a washer 593 and a nut 594 on its threaded end. A spring washer 595 is located between the head of bolt 592 and the knob 73.

The circular mounting hole 525 in the lower end of the lower support link 502 is misaligned with circular hole 580 in the ring gear support plate 575, but is aligned with circular hole 514 in the connector plate 18 on the seat pan 34. Since each circular hole is engaged with a different portion of the eccentric pin 571, rotation of knob 73 and spur gear 570 causes harmonic travel (oscillation) and rotation of the ring gear 572 and corresponding pivotal movement of the support link 502 thereby swinging the arm rest 30 in a vertical plane (arrows 32 in FIG. 2). As FIGS. 12–16 show, ring gear 572 engages spur gear 570 in such a manner that, when knob 73 is rotated, intermediate portion 587 of eccentric pin 571 causes ring gear mounting plate 575 and its associated ring gear 572 to move in a planocentric plate around or relative to spur gear 570. Such motion is transmitted from ring gear plate 575, through the pins 566 to forward or lower arm support link 502 thereby causing the latter to pivot on outer cylindrical portion 586 of eccentric pin 571. The motion of forward arm support 502 is transmitted to arm rest frame 504, causing the latter to be shifted in a vertical plane (either forward and down or rearward and up, depending on the direction of rotation of knob 73) and is also transmitted to link plate 537 thereby causing rear or upper arm support link 500 to move parallel to forward or lower arm support link 502. Ring gear 572 and its mounting plate 575 travel in a slightly oscillatory path but this oscillatory motion is not transmitted to the arm support link 502 because of the play of the pins 566 in the relatively large pin holes 578 in ring gear mounting plate 575. The use of the foregoing arrangement, i.e., the eccentrically arranged spur gear 570 and ring gear 572, enables the arm rest assembly 22 to be shifted without incidental oscillatory motion by means of knob 73 but positively prevents slippage of the arm rest assembly 22 from a position into which it is moved, even if heavy forces are imposed thereon. Slippage cannot occur because when a load is applied the spur gear and the eccentric shaft tend to rotate in opposite directions relative to one another, which is impossible, and thus the unit locks. As is apparent, since arm rest 30 is only connected at one pivot point by pin 531, it can be rotated thereabout (arrow 31 in FIG. 2) regardless of the position in which it is placed by knob 73. Two possible positions of arm rest 30 are shown in FIGS. 1 and 2 and a rear storage position is shown in phantom lines in FIG. 2.

Stop pins 517 on the connector plate 18 are engageable with the stop notches 584 in stop plate 582 to limit arm rest travel in the direction of arrows 32. Ring gear 572 is also provided with a stop pin 572A which is engageable with the notches 584 in stop plate 582 to limit rotational travel of the ring gear.

As FIGS. 1 and 8 best show, the underside of arm rest plate 504 rests on an edge of link plate 530 and as a result, remains in a generally horizontal position even as the knob 73 is rotated to cause the links 500 and 502 to be shifted. However, the arm rest 30 can be swung forwardly (i.e., counterclockwise from the position shown in FIG. 1) to a relatively vertical position as shown in FIG. 2, thereby enabling the arm rest to be moved out of the way if the machine operator wishes to move sideways in the seat. When the elongated links 500 and 502 are in their most upright position (i.e., moved fully clockwise with respect to FIGS. 1 and 2), location of the arm rest 30 in the generally vertical position shown in FIG. 2 effectively causes the entire arm rest assembly 22 to be in a stored position out of the operator's way.

We claim:
1. In a vehicle seat:
    a support;
    an arm rest;

and means for adjustably mounting said arm rest on said support and including:

a linkage having upper and lower ends, said linkage including first and second elongated support links and a link plate;

first means for pivotally connecting the upper end of said linkage to said arm rest so that said arm rest is pivotable in a plane about a first point, said first means including means for pivotally connecting one end of said first support link and said link plate to said arm rest, means for pivotally connecting one end of said second support link to said link plate, and means for pivotally connecting the other end of said second support link to said support plate;

and second means for connecting the lower end of said linkage to said support so that said linkage and said arm rest attached thereto are adjustably movable in said plane about a second point, said second means including:

an eccentric pin;

means for rotatably mounting said eccentric pin on said support;

a spur gear connected to said eccentric pin;

a ring gear having at least one more internal tooth than the spur gear connected to the other end of said first support link and engaged with said spur gear;

and a control knob connected to said eccentric pin and rotatable to effect rotation of said eccentric pin and said spur gear to thereby effect planocentric rotation of said ring gear whereby said first support link and said arm rest are moved to desired locked positions relative to said support plate.

2. A vehicle seat according to claim 1 including means for limiting pivotal movement of said arm rest about said first point.

3. In a vehicle seat:

a support;

an arm rest;

and means for adjustably mounting said arm rest on said support plate and comprising:

first and second elongated support links and a link plate;

means for pivotally connecting one end of said first support link and said link plate to said arm rest;

means for pivotally connecting one end of said second support link to said link plate;

means for pivotally connecting the other end of said second support link to said support plate;

an eccentric pin;

means for rotatably mounting said eccentric pin on said support;

a spur gear connected to said eccentric pin;

a ring gear having at least one more internal tooth than the spur gear connected to the other end of said first support link and engaged with said spur gear;

and a control knob connected to said eccentric pin and rotatable to effect rotation of said eccentric pin and said spur gear to thereby effect planocentric rotation of said ring gear whereby said first support link and said arm rest are moved to desired locked positions relative to said support plate.

4. A vehicle seat having at least one adjustable arm rest assembly supported on a connector plate and comprising:

an arm rest;

first and second elongated support links;

a link plate;

first means for pivotally connecting one end of said first support link and said link plate to said arm rest;

second means for pivotally connecting one end of said second support link to said link plate;

third means for pivotally connecting the other end of said second support link to said connector plate;

and fourth means for connecting the other end of said first link to said connector plate and comprising:

an eccentric pin;

means for rotatably mounting said eccentric pin on said connector plate;

an arm adjustment knob for rotating said eccentric pin;

planocentric gears, including a spur gear connected to be rotated by said eccentric pin and a ring gear having at least one tooth more than the spur gear engaged with said spur gear;

a ring gear support plate connected to said ring gear;

means for loosely securing said ring gear support plate to the rear end of said first support link;

whereby knob rotation causes rotation of said eccentric pin and said spur gear and said ring gear and corresponding pivotal movement of said first support link and said arm rest.

5. A vehicle seat according to claim 4 including stop means on said connector plate engageable with stop means connected to said spur gear to limit spur gear rotation and, therefore, arm rest travel.

* * * * *